J. C. FLETCHER.
TOOL HOLDER.
APPLICATION FILED JULY 17, 1919.
1,343,257.
Patented June 15, 1920.
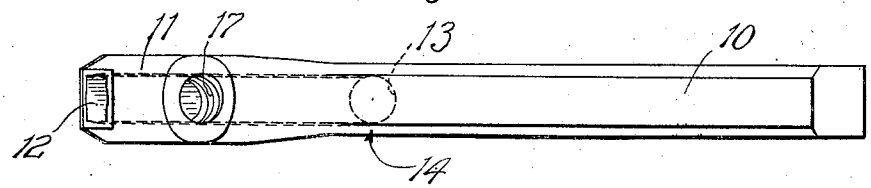
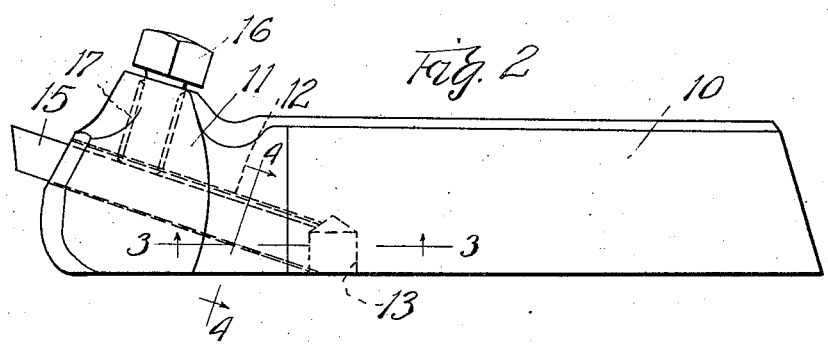
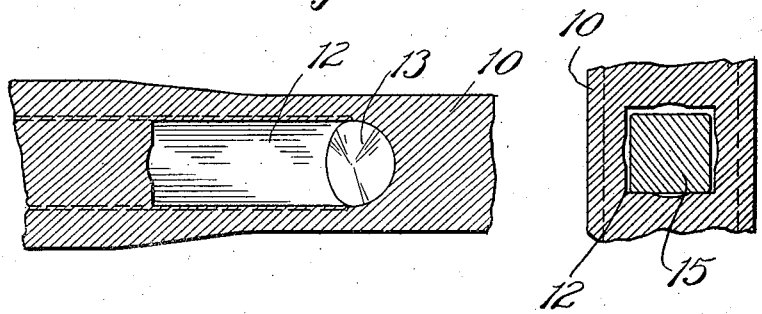 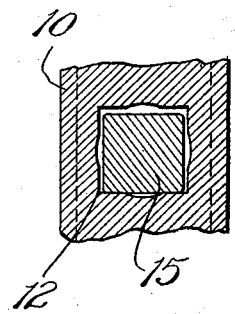
Inventor
Joseph C. Fletcher
By Miller Chindahl & Parker
Attys

UNITED STATES PATENT OFFICE.

JOSEPH C. FLETCHER, OF CHICAGO, ILLINOIS, ASSIGNOR TO ARMSTRONG BROS. TOOL CO., OF CHICAGO, ILLINOIS, A CORPORATION OF ILLINOIS.

TOOL-HOLDER.

1,343,257.  Specification of Letters Patent.  Patented June 15, 1920.

Application filed July 17, 1919. Serial No. 311,563.

*To all whom it may concern:*

Be it known that I, JOSEPH C. FLETCHER, a citizen of the United States, residing at Chicago, in the county of Cook and State of Illinois, have invented certain new and useful Improvements in Tool-Holders, of which the following is a specification.

My invention relates to improvements in tool holders of the type described in Patent No. 492,381 to Armstrong.

One object of my invention is to materially strengthen such a tool holder along its lower edge when the tool socket opening occurs which is the weakest point of the holder shown in the above mentioned patent. I accomplish all of the objects accomplished in the patented device, such as holding the tool at a proper angle, providing clearance for chips in making the tool holder, and a stop to prevent the tool from sliding too far back in the socket.

In the accompanying drawings, Figure 1 is a plan view and Fig. 2 a side elevation of my improved tool holder. Figs. 3 and 4 are detailed sections on the lines 3—3 and 4—4 respectively, of Fig. 2.

As illustrated in the drawings, a tool holder according to my invention comprises the usual shank 10 having a slightly enlarged head 11. The socket for the tool is a sloping hole 12 shaped in cross section as shown in Fig. 4, being square with a slight depression in the center of each side. This socket is formed by drilling a round hole and then broaching it out square, the dimensions of the square being slightly less than the diameter of the drill, resulting in the depressions in the center of each side. In the devices of the prior art, this slanting hole was drilled clear through the tool holder, or as illustrated in Patent No. 492,381, the drill was fed in far enough to make a large opening in the bottom of the tool holder, but was not fed quite completely through.

In my improved tool holder, I drill a short hole 13 upwardly from the bottom surface of the shank to intersect the socket 12 as clearly shown in Fig. 2. This hole provides a clearance for chips in making the tool holder, and its rear side forms a stop for the tool. It will be noted, however, that the material remaining on either side of the hole in the bottom is of a minimum thickness only at one point, which point is indicated by the reference character 14 in Fig. 1 and is reinforced by the tapering portions immediately adjacent which spread out rapidly into the solid portion of the shank. This construction is much stronger than that of the device shown in Patent No. 492,381 in which the bottom opening is bounded by two narrow flanges of considerable length. The importance of strength at this point, particularly against buckling, is apparent when it is remembered that frequently it is necessary to adjust the tool holder so that this portion of the bottom of the shank bears on the edge of the tool rest and is subjected to very heavy bending stresses as well as the upward pressure of the tool rest. The hole 13 can be made of a diameter equal to the dimension of the square tool socket as illustrated, or even a trifle smaller, in which case it will still be possible to drill and broach the socket and get the chips out through the hole.

I have illustrated the customary tool 15 held in place in the socket 12 by the usual set screw 16 passing through a suitably threaded hole 17 at right angles to the socket.

I claim as my invention:—

1. In a tool holder, a shank, an enlarged head on the end of said shank, said enlarged head having a substantially square cutter socket extending therethrough and a cylindrical hole being formed in the bottom of said shank extending upwardly and communicating with the rear end of said socket.

2. A tool holder having, in combination, a shank, a head on said shank, said shank having a passageway extending vertically upward from its bottom face, a forwardly and upwardly extending tool-receiving socket communicating with the upper end of said first-mentioned passageway, and means for clamping a tool in said tool-receiving socket.

3. A tool holder having a shank, said shank having a cylindrical hole extending inwardly from one face thereof, said shank also having a tool-receiving socket opening at one end thereof and extending within said shank into communication with the end of said first-mentioned cylindrical hole.

4. In a tool holder, in combination, a shank, an inwardly extending tool-receiving socket in said shank, said socket terminating at a point substantially above the bottom of said shank, and a vertical passageway entering the bottom of said shank and at its end communicating with said socket.

5. In a tool holder, in combination, a shank, a square socket extending within said shank, the center portion of each side of said square socket being cut away on the arc of a circle concentric with the center of said socket and of slightly greater diameter, said socket terminating within said shank at a point substantially above the bottom of said shank, and a cylindrical passageway of a diameter not greater than the diameter of said circle extending upwardly from the bottom of said shank and at its upper end communicating with said socket.

In testimony whereof, I have hereunto set my hand.

JOSEPH C. FLETCHER.